A. Walton,
Gas Meter.
No. 1,413. Reissued Feb. 17, 1863.
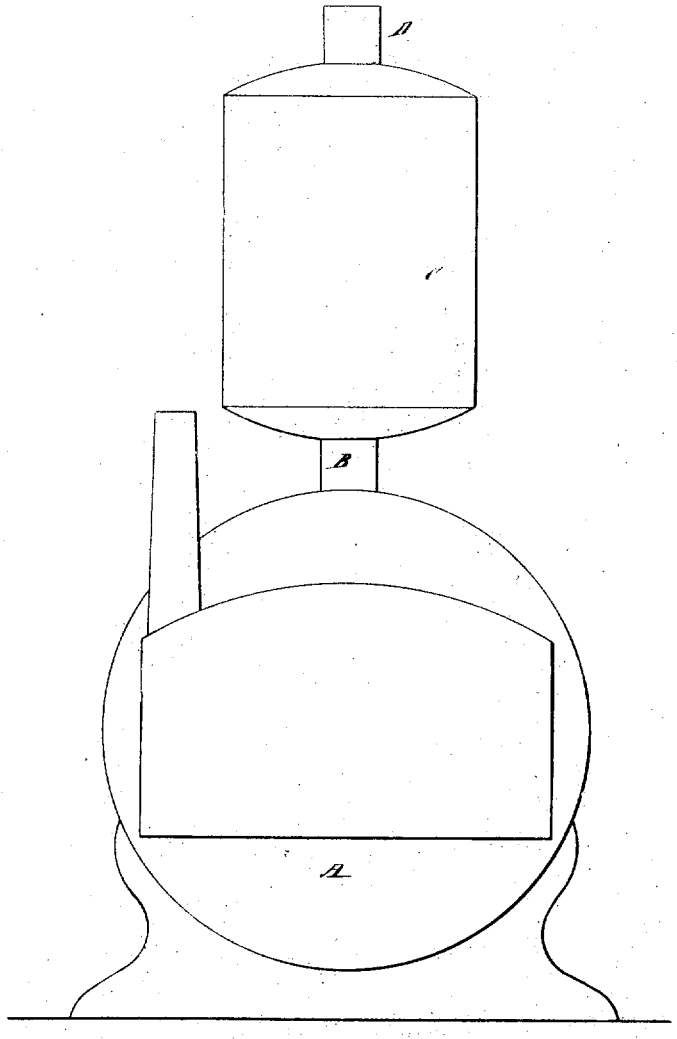
Witnesses
Charles E. Foster
C. Howson
Inventor
A. Walton
by Henry Howson
Atty

BEST AVAILABLE COPY

UNITED STATES PATENT OFFICE.

ALLEN WALTON, OF PHILADELPHIA, PENNSYLVANIA.

IMPROVED APPARATUS FOR MIXING GASES.

Specification forming part of Letters Patent No. 34,994, dated April 15, 1862; Reissue No. 1,413, dated February 17, 1863.

*To all whom it may concern:*

Be it known that I, ALLEN WALTON, of Philadelphia, Pennsylvania, did obtain Letters Patent of the United States, dated April 15, 1862, for an Improvement in Apparatus for Mixing Gases, which Letters Patent I deem inoperative and invalid by reason of a defective and insufficient specification; and I do hereby declare the following to be a full, clear, and exact description of the same, reference being had to the accompanying drawings, and to the letters of reference marked thereon.

My invention consists of a chamber or mixing-reservoir so arranged as to intercept the continuity or uniform diameter of a distributing-pipe, into which air and gas are introduced in definite proportions by a meter or by meters operating in unison with each other, so that the said air and gas may be thoroughly mixed prior to escaping at the burners, and so that the flames from the latter may be brilliant and steady, as fully described hereinafter.

In order to enable others skilled in the art to make and apply my invention, I will now proceed to describe the manner of carrying it into effect.

In the accompanying drawing, which forms a part of this specification, A is a front view of a gas-meter, for which an English patent was granted to James Crutchett July 12, 1842. Crutchett's invention may be said to consist of two meters contained in one exterior casing, one meter being devoted to the measurement of illuminating-gas and the other to the measurement of air, the two meters operating in unison with each other, so that the quantity of gas given out by one meter will bear a definite proportion to the air given out by the other.

It is well known that by mixing air with gas generated from many qualities of coal, and more especially from rosin, the residuum of coal-oil after distillation, and other substances the illuminating power of the gas is increased. If this process of mixing air with gas, however, be conducted without a strict regard to definite proportions dangerous explosions are liable to ensue; hence the invention of Crutchett, by which definite and safe proportions of air and gas are discharged together into the distributing-pipes.

In using two meters, or rather a double meter, according to Crutchett's patent, I have found that although proper proportions of air and gas are delivered into the distributing-pipes from the meters, the flames of the burners are liable to waver or flicker, a result which I believe to be owing to the want of a thorough admixture of the air and gas, both being simultaneously discharged direct from the meter or meters into the ordinary distributing-pipes and continued in an uninterrupted course to the burner. In order to remedy this defect I place at any point in the distributing-pipe between the meters and the burner a chamber or vessel communicating with and in fact forming a part of the distributing-pipe. In the accompanying drawings this chamber, or, as I shall term it, the "mixing-reservoir" is situated adjacent to Crutchett's air and gas meter A, the two fluids passing together directly into the reservoir through the pipe B, and from the reservoir to the burners through the distributing-pipe D. In passing from the meter through the pipe B the two fluids are apt to flow in independent, or at least partially unmixed, currents; but the moment they arrive at the chamber C, which is in effect a simple enlargement of the distributing-pipe, an expansion of the fluids takes place to an extent determined by the capacity of the chamber. In passing from the latter, and on entering the distributing-pipe, however, a sudden contraction of the two fluids takes place. It is by this expansion and contraction of the two fluids in the chamber or enlargement of the pipe which causes the desired thorough admixture of the fluids, and which converts them, as it were, into one fluid—that is, into an illuminating-gas—which produces a steady and brilliant flame at the burners. I prefer to intercept the continuity of the distributing-pipe from the gas and air meters by a reservoir, C, placed at a point near to that where the first junction of the air with the gas takes place, although the desired effect may be produced by placing the reservoir at any point between the meters and the burners.

Without confining myself to the double meter known as Crutchett's patent (which I have referred to for ready illustration) or to any particular construction or arrangement of meters, whether they be wet or dry meters, providing they operate in unison with each other for measuring and causing the primary junction of definite quantities of air with definite quantities of gas, and without confining myself to any particular form or arrangement of the chamber C,

I claim as my invention and desire to secure by Letters Patent—

A chamber or mixing-reservoir, C, so arranged as to intercept, for the purpose herein described, the continuity or uniform diameter of a distributing-pipe into which air and gas are introduced in definite quantities, and through which they are directed from a meter or meters to the burner.

In testimony whereof I have signed my name to this specification before two subscribing witnesses.

ALLEN WALTON.

Witnesses:

HENRY HOWSON,
JOHN WHITE.